United States Patent [19]

Leyshon

[11] Patent Number: 5,016,862

[45] Date of Patent: May 21, 1991

[54] VIBRATION ISOLATION ARRANGEMENT

[75] Inventor: David R. Leyshon, Brighton, Great Britain

[73] Assignee: Bath Institute of Medical Engineering Limited, Bath, United Kingdom

[21] Appl. No.: 359,670

[22] PCT Filed: Nov. 12, 1987

[86] PCT No.: PCT/GB87/00808
§ 371 Date: Jul. 17, 1989
§ 102(e) Date: Jul. 17, 1989

[87] PCT Pub. No.: WO88/03619
PCT Pub. Date: May 19, 1988

[30] Foreign Application Priority Data

Nov. 15, 1986 [GB] United Kingdom ............... 8627343

[51] Int. Cl.$^5$ .................... F16F 15/06; A61G 3/00
[52] U.S. Cl. ..................................... 267/136; 5/210; 248/564; 267/173; 296/19
[58] Field of Search ............... 267/172, 173, 174, 228, 267/248, 142, 143, 69, 70, 131, 133, 136

[56] References Cited

U.S. PATENT DOCUMENTS

| 3,606,619 | 9/1971 | Stollenwerk | 5/210 |
| 3,752,526 | 8/1973 | Van Der Burgt et al. | 296/19 |
| 3,767,181 | 10/1973 | Van der Burgt et al. | 267/136 |
| 3,826,457 | 7/1974 | Houx de Longchamp | 248/564 |
| 3,831,996 | 8/1974 | Layer | 296/19 |
| 4,078,269 | 3/1978 | Weipert | 296/19 X |

Primary Examiner—Matthew C. Graham
Attorney, Agent, or Firm—Bromberg & Sunstein

[57] ABSTRACT

A vibration isolation arrangement, for example for supporting a stretcher in an ambulance, comprises a lever (16) which extends between a base structure (6) and a support frame (4). The lever (16) can pivot about a fulcrum (30) and is acted upon by a spring (28). The fulcrum (30) is displaceable by an actuator (32) along a guide (34). Such displacement not only varies the stress of the spring (28), but also alters the moment arm (h) between the spring (28) and the fulcrum (30). When raising the support frame (4) to a predetermined level, the mechanism automatically adapts to the load on the support frame (4) to provide a constant natural frequency for the system, regardless of the weight of the patent being carried.

12 Claims, 2 Drawing Sheets

VIBRATION ISOLATION ARRANGEMENT

TECHNICAL FIELD

This invention relates to a vibration isolation arrangement for supporting a mass on a structure which is subject to vibration. The present invention is particularly, although not exclusively, concerned with suspension apparatus for supporting a load in a moving vehicle, such as a stretcher carrying a sick or injured patient in an ambulance.

BACKGROUND ART

There is concern that the transport of injured patients by road can have a detrimental effect on their medical condition. To a significant extent, this detrimental effect can be attributed to the transmission of oscillations of the vehicle to the patient. Vertical oscillations of the vehicle are experienced as front to back vibrations of a supine patient, and it is known that humans are sensitive far more to front to back vibrations than to up-and-down vibrations, such as are experienced by a seated or standing person in a vehicle.

There is therefore a need to support supine patients in ambulances in a manner which will isolate the patient from vertical vibrations of the ambulance. Since, however, the natural frequency of any conventional spring-mass system depends on the load, and consequently on the weight of the person being carried, a system giving adequate vibration isolation for one person would not perform satisfactorily for another person of different weight. Furthermore, it is desirable for the mean ride level of the patient to be independent of their weight, in order to assist ambulance staff in performing any necessary treatment on the patient.

GB1447261 discloses a suspension device for a vehicle seat. The device comprises two pairs of levers mounted in a scissor arrangement. The lower ends of the levers of each pair are movable in a frame fixed to the vehicle, while the upper ends of the levers carry the seat. The pivots of the two pairs of levers are interconnected by a shaft which moves along a cam surface as the seat moves up and down. Springs act to bias the shaft towards the upper end of the cam surface, so biasing the seat upwardly. The inclination of the cam surface is adjustable so as to adjust the spring rate of the springs as applied to the seat. Thus, the suspension device can be adapted to the weight of a person sitting in the seat.

The device of GB1447261 is apparently adjusted by the occupant of the seat to obtain a firmer or softer ride according to his own preference. It is likely that the occupant would make repeated adjustments over a period of time until the subjective optimum is reached. However, such a progressive adjustment is not normally possible, nor necessarily desirable, in suspension devices used for supporting sick or injured people in ambulances. In such cases, the need is to provide a suspension system which automatically adjusts itself in dependence on the weight of the patient, in order to avoid, as far as possible, the transmission of vibrations from the vehicle to the patient during travel under emergency conditions.

DISCLOSURE OF INVENTION

According to the present invention there is provided a vibration isolation arrangement for supporting a mass on a structure which is subject to vibration, the arrangement comprising a lever extending between the structure and the mass, the lever being pivotable against the action of resilient means about a fulcrum which is displaceable relatively to the lever along a predetermined path.

The predetermined path along which the fulcrum is displaceable is preferably straight. This will give a constant natural frequency of oscillation, regardless of load carried, provided that the resilient means has a linear characteristic over the full range of oscillation.

The orientation of the predetermined path is preferably such that displacement of the fulcrum along the predetermined path not only varies the moment arm between the fulcrum and the line of action of the resilient means, but also varies the stress in the resilient means. The predetermined path may be defined by a guide which is fixed with respect to the structure.

In a preferred embodiment, displacement of the fulcrum is achieved by means of an actuator, which may be an electric jack.

The present invention also provides suspension apparatus utilizing two vibration isolation arrangements as defined above. Where the suspension arrangement is used to support a stretcher on the floor of an ambulance, the vibration isolation arrangements respectively support opposite ends of a platform for receiving the stretcher. The vibration isolation arrangements may be operated independently, in order to provide the facility to adjust the fore and aft and/or side-to-side inclination of the stretcher.

MODE FOR CARRYING OUT THE INVENTION

Figure 1:
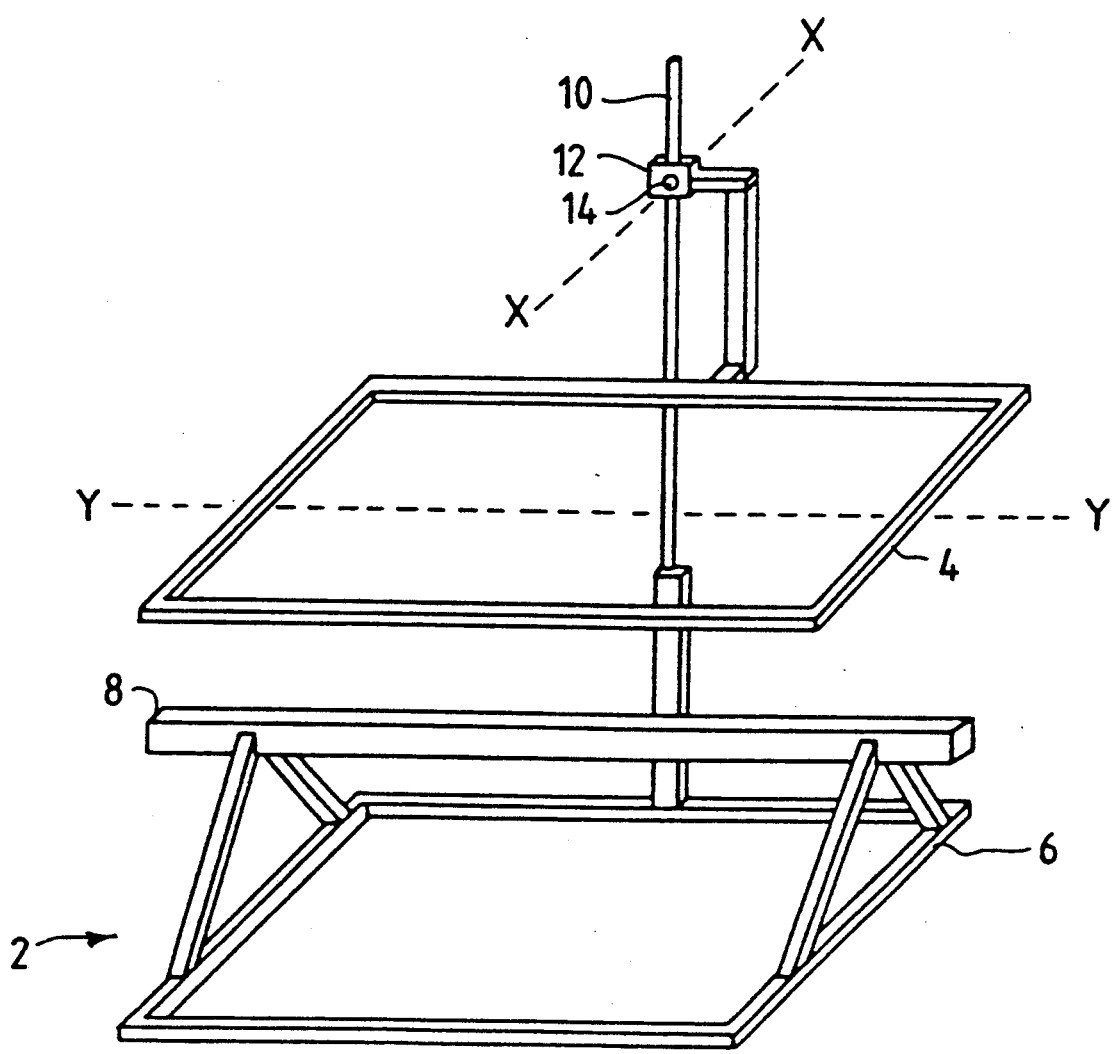
FIG. 1 is a partial diagrammatic view of suspension apparatus for supporting a stretcher.

As shown in FIG. 1, the apparatus comprises a base 2 above which is positioned a support frame 4. In use, the base 2 will be secured to the floor of an ambulance. The base 2 comprises a mounting frame 6 and a longitudinal beam 8 which is supported above the mounting frame 6. A column 10 extends upwardly from the mounting frame 6, and the support frame 4 is suspended from a sleeve 12 which is slidable on the collar 10. The sleeve 12 incorporates a pivot 14 which permits pivotal movement of the support frame 4 about the axis X—X. The axis X—X is positioned above the support frame 4, approximately at the same vertical level as the expected combined center of gravity of the support frame 4 and the load supported on it, namely a stretcher and its patient.

Figure 2:
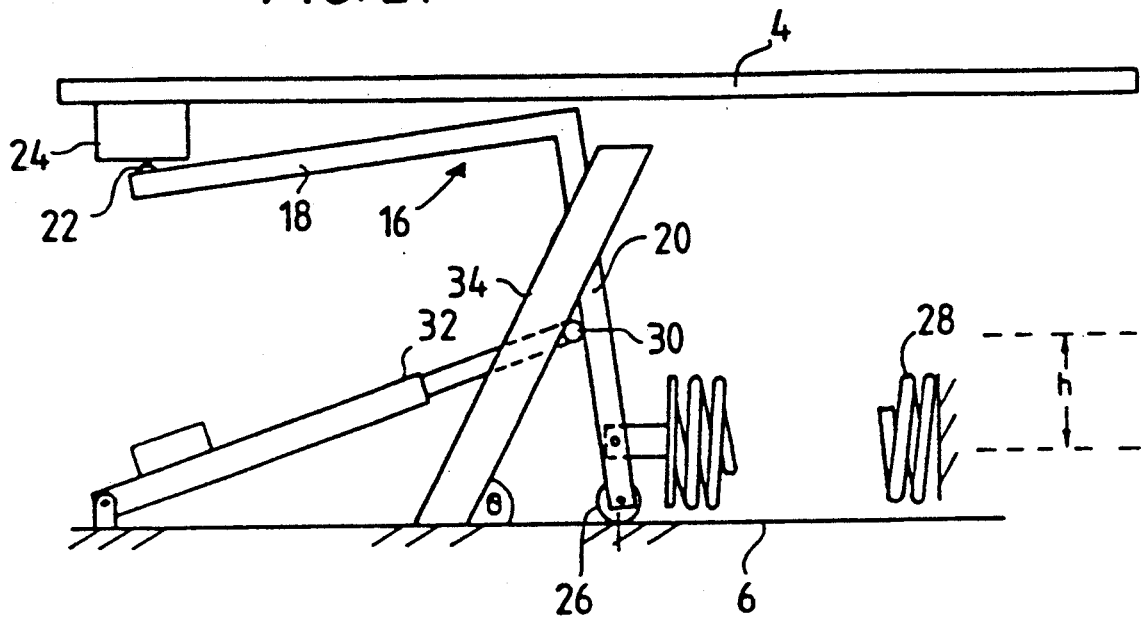
FIG. 2 is a diagrammatic side view of the suspension apparatus of FIG. 1.

The support frame 4 is supported vertically with respect to the base 2 by two similar vibration isolation arrangements. FIG. 2 shows one of these arrangements which comprises a cranked lever 16 which can be regarded as having a generally horizontal portion 18 and a generally vertical portion 20. The free end of the horizontal portion 18 is provided with a roller 22 which engages a flange 24 on the support frame 4.

The free end of the vertical portion 20 carries a roller 26 which engages a track secured to the mounting frame 6.

A spring 28 is hinged to the vertical portion of the lever 16 a short distance above the roller 26. The other end of the spring 28 engages an abutment which is fixed to the mounting frame 6.

A fulcrum for the lever 16 is provided by an element 30 mounted on the end of an actuator 32. The actuator 32 is an electric jack which can be extended or retracted under power, but which maintains its position when power is interrupted. The end of the actuator 32 away from the fulcrum 30 is hinged to the mounting frame 6.

The fulcrum 30 is guided along a predetermined path by means of a guide 34. The guide 34 is secured to the mounting frame 6, and provides a straight path for the fulcrum 30, which path is inclined to the vertical at an angle The fulcrum 30 engages a straight track on the vertical portion 20 of the lever 16, and it will be appreciated that the path established by the guide 34 is inclined to the vertical portion 20.

Figure 3:
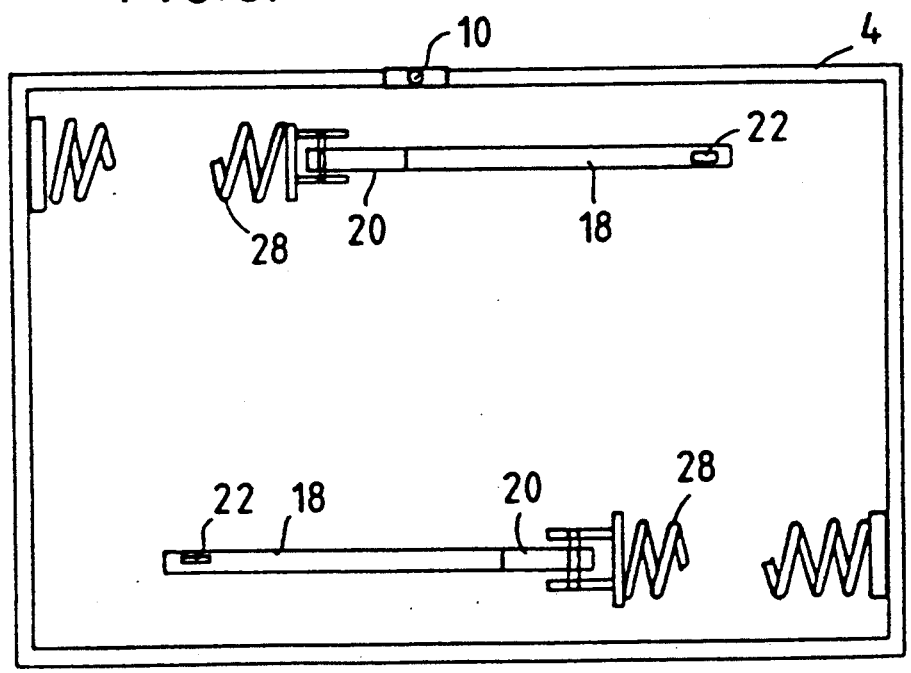
FIG. 3 is a diagrammatic plan view of the suspension apparatus.

FIG. 3 shows both of the vibration isolation arrangements. The rollers 22 of the two arrangements engage the support frame 4 at diagonally opposite positions. The actuators 32 of the two arrangements may be operated independently from one another.

For operation, the mounting frame 6 is secured to the floor of an ambulance. In order to receive a stretcher, the support frame 4 is fully lowered, by retracting the actuators 32, until the support frame 4 rests on the beam 8. In this condition, the springs 28 are substantially fully extended, and the fulcrum 30 is positioned towards the bottom of the guide 34. As a result, the lever 16 is pivoted to the right (as seen in FIG. 2) under the weight of the support frame 4.

A stretcher is then placed on the support frame 4, or wheeled into position over it. When the stretcher is in position, the jacks 32 are actuated to extend them. This causes the fulcrum to move upwards and to the right along the guide 34, as seen in FIG. 2. Initially, this movement will cause the springs 28 to be compressed, without the support frame 4 and the stretcher being raised. However, it will be appreciated that displacement of the fulcrum 30 along the guide 34 not only stresses the spring 28, but also increases the length h of the moment arm between the spring 28 and the fulcrum 30. At a position depending on the load supported by the support frame 4, the moment exerted by the spring 28 about the fulcrum 30 will exceed the moment exerted by the support frame 4 acting on the roller 22. When this happens, the support frame 4 will be lifted off the beam 8, and the stretcher will be supported solely by the springs 28, acting through the levers 16. When the support frame 4 has reached the required height, power to the actuators 32 is disconnected, and the fulcrum 30 then remains fixed in position. The support frame 4 is then isolated substantially from vibration of the base 2 as the levers 16 pivot about the fulcrum 30 against the force applied by the springs 28.

Because the guide 34 is straight, the natural frequency of the system, with regard to oscillations in the vertical direction, is independent of the load carried by the support frame 4, provided that the springs 28 have linear characteristics. The natural frequency of the system is determined by the angle and consequently the system can be adapted readily to the circumstances in which it will be used. When the apparatus is used in ambulances, it has been found that a natural frequency of approximately 0.5 Hertz provides optimum vibration isolation during road travel.

The support frame, and stretcher carried on it, can be tilted, if desired, by operating the actuators 32 independently of each other to support the two ends of the support frame 4 at different levels.

The column 10 restrains the support frame 4 in the horizontal plane. Because the axis X—X is positioned close to the center of gravity of the load, vehicle acceleration in the Y—Y direction (FIG. 1) will induce very little or no pitching of the load. Consequently, if the apparatus is mounted in the vehicle with the Y—Y axis extending in the fore and aft direction of the vehicle, braking and acceleration of the vehicle will not cause pitching of the load.

INDUSTRIAL APPLICABILITY

Although the present invention has been described by reference to one aspect of its industrial applicability, namely to use in ambulances, in which the load to be supported will be a stretcher carrying a patient, it will be appreciated that a vibration isolation arrangement in accordance with the present invention can have other industrial applications. For example, the present invention could be applied to the transport of delicate instruments and equipment which need to be protected from oscillations of the vehicle in which they are carried. Furthermore, it is not essential for the base 2 to be mounted on a horizontal structure. The apparatus could, instead, be used to support a load on a vertical surface which is subject to vibration. Thus, apparatus in accordance with the present invention could, for example, be used to support vibration sensitive instruments or apparatus on a wall of a moving vehicle or other structure which is subject to vibration.

I claim:

1. A vibration isolation arrangement for supporting a mass on a structure which is subject to vibration, the arrangement comprising a lever extending between the structure and the mass, the lever being pivotable against the action of resilient means about a fulcrum,, characterized in that fulcrum is displaceable relatively to the lever along a predetermined path and in that displacement of the fulcrum along the predetermined path, in a direction to displace the lever against the action of the resilient means, increases the distance between the fulcrum and the point at which the resilient means acts on the lever.

2. A vibration isolation arrangement for supporting a mass on a structure which is subject to vibration, the arrangement comprising a lever extending between the structure and the mass, the lever being pivotable against the action of resilient means about a fulcrum, characterized in that fulcrum is displaceable relatively to the lever along a predetermined path and in that opposite ends of the lever are adapted to engage, respectively, the mass and the structure in a manner permitting displacement of the respective ends of the lever relatively to the mass and the structure.

3. In apparatus for supporting a mass on a base structure which is subject to vibration, wherein a vibration isolation arrangement is provided between the mass and the base structure, the vibration isolation arrangement comprising:

a fulcrum supported by the base structure;
a lever extending between the mass and the base structure, the lever being pivotable about the fulcrum upon relative displacement between the mass and the base structure; and resilient means acting on the lever to oppose pivotal movement of the lever under the load applied to the lever by the mass, wherein the fulcrum is displaceable relatively to the lever along a predetermined path which is fixed relatively to the base structure.

4. Apparatus as claimed in claim 3, wherein the predetermined path is straight.

5. Apparatus as claimed in claim 3, wherein the predetermined path is defined by a guide which is fixed with respect to the base structure.

6. Apparatus as claimed in claim 3, wherein an actuator is provided for displacing the fulcrum along the predetermined path.

7. Apparatus as claimed in claim 3, wherein the predetermined path extends obliquely from the base structure in a direction towards the mass and opposite the direction of the force applied to the lever by the resilient means.

8. Apparatus as claimed in claim 3, wherein opposite ends of the lever are adapted to engage, respectively, the mass and the base structure in a manner permitting displacement of the respective ends of the lever relatively to the mass and the base structure.

9. Suspension apparatus comprising a load carrying member which is supported on a base structure by two vibration isolation arrangements disposed at opposite ends of the load carrying member, each vibration isolation arrangement comprising:
 a lever extending between the mass and the base structure;
 a fulcrum supported by the base structure, the lever being pivotable about the fulcrum upon relative displacement between the mass and the base structure, the fulcrum being displaceable relatively to the lever along a predetermined path which is fixed relatively to the base structure; and
 resilient means acting on the lever to oppose pivotal movement of the lever under the load applied to the lever by the mass.

10. Suspension apparatus as claimed in claim 9, further comprising retaining means for preventing relative displacement of the load carrying member and the base structure parallel to one another.

11. Suspension apparatus as claimed in claim 10, wherein the retaining means comprises an elongate guide member which is fixed to the base structure and on which a carrying element is slidable, the load carrying member being pivotably connected to the carrying element.

12. A vehicle including suspension apparatus comprising a load carrying member which is adapted to receive a stretcher and is supported on the base structure by two vibration isolation arrangements disposed at opposite ends of the load carrying member, each vibration isolation arrangement comprising:
 a lever extending between the mass and the base structure;
 a fulcrum supported by the base structure, the lever being pivotable about the fulcrum upon relative displacement between the mass the base structure, the fulcrum being displaceable relatively to the lever along a predetermined path which is fixed relatively to the base structure; and
 resilient means acting on the lever to oppose pivotal movement of the lever under the load applied to the lever by the mass.

* * * * *